UNITED STATES PATENT OFFICE 2,495,404

ALKOXYPHENYLALKYL-ALKYL AMINES

Robert Biedermann, Basel, Switzerland, assignor to J. R. Geigy A.-G., Basel, Switzerland, a Swiss firm No Drawing. Application May 7, 1946, Serial No. 667,998. In Switzerland May 8, 1945

4 Claims. (Cl. 260—570.8)

It has been found that therapeutically valuable compounds which are araliphatic amines of the general formula

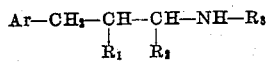

wherein

Ar means an unsubstituted or substituted aromatic radical, such as a phenyl, naphthyl, tetrahydronaphthyl, halogenophenyl, hydroxyphenyl, alkoxyphenyl, benzyloxyphenyl radical and the like or homologous radicals, $R_1$ and $R_2$ each mean an alkyl radical and $R_3$ means hydrogen or an alkyl radical, will be obtained by converting ketones of the general formula

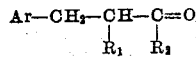

wherein Ar, $R_1$ and $R_2$ have the above defined meanings, in a conventional manner into the corresponding amines and, if necessary, transforming the substituents present in the aromatic radical Ar in any desired manner or splitting off such substituents and, if desired, introducing an alkyl substituent into the amino group, if the latter is a primary amino group.

The new compounds claimed herein possess improved analgetic properties when compared with similar compounds known hitherto. The compounds, in which Ar means an alkoxyphenyl or naphthyl radical, are particularly valuable.

The conversion of the above defined ketones into the corresponding primary or secondary amines can be effected according to the most various known methods. Secondary amines may preferably be produced by treating the ketones with reducing agents, like amalgamated aluminium or catalytically activated hydrogen, in the presence of the amines to be introduced. When working according to the catalytic hydrogenation method in the presence of ammonia primary amines may be made. The Leuckart's method can be used for the production of primary and secondary amines. According to this method the above defined ketones are condensed with formamide or with the formyl compounds of monoalkylamines and the resulting formyl compounds of the amines saponified to give the free amines. Furthermore, the ketones can be reduced to the secondary alcohols, the latter being then esterified by means of a hydrohalogenic acid and the resulting esters interacted with ammonia or monoalkylamines. Primary amines of the above defined formula may also be obtained from the oximes or hydrazones of the ketones by reducing the latter. Finally there may be mentioned that unsaturated ketones can be converted into the corresponding amines according to any one of the above described methods of hydrogenating amination, while simultaneously saturating the double bond.

Secondary amines may also be obtained by alkylation of the corresponding primary amines, as has already been mentioned above. For such substitution of the amino group the known methods may be used; the most convenient method is that consisting in the interaction with hydrohalogenic esters or with sulfuric esters of alcohols or the interaction with aldehydes or ketones with reduction and the like. If desired, substituents present in the aromatic radical can also be transformed or split off after the amination. As examples may be mentioned: the conversion of the nitro group through the amino group into the hydroxy group, the splitting of alkoxy groups, saponification of acyloxy groupings to hydroxy groups and so on. If halogen atoms linked to an aromatic radical are present in the starting materials, the same can be replaced simultaneously with other operations, for instance with the reduction of Schiff's bases present as intermediate products, or also in a single operation by means of hydrogen.

The ketones used as starting materials—as far as the same are unknown—can be prepared for instance by aralkylation of ketones containing replaceable hydrogen at an α-carbon atom.

The invention will now be illustrated by the following examples without being limited thereto; the parts are by weight.

EXAMPLE 1

15 parts of 1-(4'-methoxyphenyl)-2-methyl-pentanone-(3) are dissolved in 110 parts of 94% alcohol and, after addition of 10 parts of an aqueous 41% monomethylamine solution, treated at 50–60° C., with 5 parts of aluminium amalgam. When the reduction has been completed, the aluminium hydroxide is filtered off, thorough washing with alcohol carried off, the alcohol distilled off and the resulting secondary amine dissolved in dilute hydrochloric acid. This solution is freed from the non-basic ingredients by means of ether and the base made free by means of caustic soda lye. The base is then extracted with ether, the solution dried over anhydrous Glauber's salt, the ether distilled off and the free base, the 1-(4'-methoxyphenyl)-2-methyl-3-N-methylamino-pentane, distilled in vacuo at 0.5 mm. pressure and at 102° C.

When starting from 1-(3':4'-dimethoxyphenyl)-2-methyl-pentanone-(3) or from 1-(3':4'-methylenedihydroxyphenyl)-2-methyl-pentanone-(3) and methylamine, the corresponding amines, i. e., 1 - (3':4' - dimethoxyphenyl) -2-methyl-3-N-methylaminopentane and 1-(3':4'-methylenedihydroxyphenyl)- 2 -methyl- 3 -N-methylaminopentane respectively are obtained.

The splitting of the methoxy group is carried out in the conventional manner by means of boiling hydrobromic acid; in this way there may be obtained from 1-(4'-methoxyphenyl)-2-methyl-3-N-methylamino-pentane the 1-(4'-hydroxyphenyl) - 2 - methyl-3-N-methylamino-pentane; melting point of the hydrochloride 163–164° C.

The same compound may also be obtained from 1-(4'-aminophenyl)-2-methyl - 3 - N - methylamino-pentane by diazotation of the amino group in a sulfuric acid solution and by subsequently boiling the whole.

EXAMPLE 2

20 parts of 1-(4'-methoxyphenyl)-2-methyl-pentanone-(3) are heated for 8 hours to 165–170° C. with 25 parts of formamide. Then the material is allowed to cool and the resulting formyl compound is subjected to hydrolysis by heating the same under reflux for 3 hours with 100 parts of concentrated hydrochloric acid. After complete hydrolysis it is allowed to cool, diluted with small quantities of water and the base made free by means of a concentrated solution of sodium hydroxide. The base is extracted with ether, the ether distilled off and the residue dissolved in dilute hydrochloric acid. After extraction with ether the base is again made free by means of caustic soda lye and extracted with ether, the ethereal solution being dried with anhydrous Glauber's salt. The solvent is subsequently distilled off and the base fractionated. The 1-(4'-methoxyphenyl)-2-methyl - 3 - aminopentane distils at 90° C. under a pressure of 0.06 mm. The latter compound can also be produced from 1-(4'-methoxyphenyl)-2-methylpentene-1-one-(3) by simultaneous amination and hydrogenation in the presence of platinum oxide or also by reduction of the oxime of the 1-(4'-methoxyphenyl)-2-methyl-pentanone-(3) by means of sodium amalgam in glacial acetic acid. The resulting primary amine can be converted into the monomethyl amine derivative by means of formaldehyde and of a reducing agent, like for instance aluminum amalgam.

EXAMPLE 3

20 parts of 1-(3'-bromo-4'-methoxyphenyl)-2-methylpentanone-(3) are dissolved in 140 parts of 94% alcohol and, after addition of 10 parts of aqueous 60% monoethylamine solution, treated at 60–70° C. with 7 parts of aluminum amalgam. Then working up continues in the manner described in Example 1. On reduction the bromine atom is replaced by hydrogen. When using, instead of the brominated derivative, the analogous chlorine compound, it will be necessary to work at a higher temperature, as the chlorine is split off only at 90–100° C.

The so-obtained 1 - (4' - methoxyphenyl) - 2 - methyl-3-N-ethylaminopentane distils at 90° C., when using a pressure of 0.03 mm.

When working in the manner described either in any one of the above examples or in Example 4, a large number of similar compounds may be made, some of which are enumerated in the following table:

*Table I*

| Substance | B. P. of the free base | M. P. of the hydrochloride |
|---|---|---|
|  |  | °C. |
| 1-(4'-ethoxyphenyl)-2-methyl-3-N-methylaminopentane |  | 175 |
| 1-(4'-methoxyphenyl)-2-methyl-3-N-isopropylaminopentane | B. P.$_{0.03}$ 92° C. |  |
| 1-(4'-hydroxyphenyl)-2-methyl-3-N-ethylaminopentane |  | 200 |
| 1-(4'-hydroxyphenyl)-2-methyl-3-N-butylaminopentane |  | 163 |
| 1-(3'-methyl-4'-methoxyphenyl)-2-methyl-3-N-methylaminopentane | B. P.$_{10}$ 154° C. |  |
| 1-(3'-methyl-4'-methoxyphenyl)-2-methyl-3-N-ethylaminopentane | B. P.$_{10}$ 156° C. |  |
| 1-(3'-chloro-4'-ethoxyphenyl)-2-methyl-3-N-methylaminopentane |  | 166 |
| 1-(3'-chloro-4'-ethoxyphenyl)-2-methyl-3-N-ethylaminopentane | B. P.$_{0.06}$ 114° C. |  |
| 1-(4'-n-hexyloxyphenyl)-2-methyl-3-N-methylaminopentane | B. P.$_{0.15}$ 118° C. |  |
| 1-(4'-butoxyphenyl)-2-methyl-3-aminopentane | B. P.$_{0.03}$ 98° C. |  |
| 1-(4'-butoxyphenyl)-2-methyl-3-N-methylaminopentane | B. P.$_{0.1}$ 105° C. |  |
| 1-(4'-isopropyloxyphenyl)-2-methyl-3-N-methylaminopentane | B. P.$_{0.3}$ 92° C. |  |
| 1-(4'-benzyloxyphenyl)-2-methyl-3-N-methylaminopentane | B. P.$_{0.3}$ 158° C. |  |

EXAMPLE 4

20 parts of 1-(2-methoxyphenyl)-2-methyl-pentanone-(3) and 8 parts of ethylamine are dissolved in 60 parts of absolute benzene and hydrogenated at 50° C. with 0.5 part of platinum oxide until the calculated quantity of hydrogen has been taken up. After filtration the base is isolated as described in Example 1 and distilled.

The 1-(2'-methoxyphenyl)-2-methyl-3-N-ethylaminopentane thus obtained distils at 10 mm. pressure at 150° C.

When working in accordance with the methods described in the above examples the following further compounds can be produced:

*Table II*

| Substance | B. P. of the free base | M. P. of the hydrochloride |
|---|---|---|
|  |  | °C. |
| 1-(2'-methoxyphenyl)-2-methyl-3-aminopentane | B. P.$_{0.5}$ 83° C. |  |
| 1-(2'-methoxyphenyl)-2-methyl-3-N-methylaminopentane | B. P.$_{0.05}$ 80° C. |  |
| 1-(2'-hydroxyphenyl)-2-methyl-3-N-ethylaminopentane | B. P.$_{0.04}$ 124° C. |  |
| 1-(2'-hydroxy-5'-chlorophenyl)-2-methyl-3-N-methylaminopentane |  | 188 |
| 1-(2'-hydroxy-5'-chlorophenyl)-2-methyl-3-N-ethylaminopentane | B. P.$_{0.05}$ 130° C. |  |
| 1-(2'-methoxy-5'-chlorophenyl)-2-methyl-3-N-methylaminopentane | B. P.$_{0.05}$ 102° C. |  |
| 1-(2'-methoxy-5'-chlorophenyl)-2-methyl-3-N-ethylaminopentane |  | 201 |
| 1-(2'-ethoxy-5'-chlorophenyl)-2-methyl-3-N-methylaminopentane | B. P.$_{0.01}$ 100° C. | 188 |
| 1-(2'-ethoxy-5'-chlorophenyl)-2-methyl-3-N-ethylaminopentane |  | 192 |
| 1-(2'-methoxy-5'-methylphenyl)-2-methyl-3-N-methylaminopentane | B. P.$_{0.02}$ 112° C. |  |
| 1-(2'-methoxy-5'-methylphenyl)-2-methyl-3-N-ethylaminopentane | B. P.$_{0.2}$ 113° C. |  |

EXAMPLE 5

20 parts of 1-(2':3'-dimethoxy-5'-bromophenyl)-2-methyl-pentanone-(3) are dissolved in 150 parts of 94% alcohol and treated at 60–70° C., in the presence of 10 parts of an aqueous 41% methylamine solution, with 8 parts of aluminium amalgam. After completion of the reaction the aluminium hydroxide is filtered off and the base worked up as described in Example 1. Also in this case the bromine atom is replaced by hydrogen.

The 1-(2':3'-dimethoxyphenyl)-2-methyl-3-N-methylaminopentane distils at 107° C. under a pressure of 0.03 mm.

The following compounds may be obtained in a similar way: 1-(2':3'-dimethoxyphenyl)-2-methyl-3-N-ethylaminopentane B. P.$_{0.04}$ 113° C., 1-(2':3'-dimethoxy-5'-chlorophenyl)-2-methyl-3-N-methylaminopentane B. P.$_{0.07}$ 126° C., 1-(2':3'-dimethoxy-5'-chlorophenyl)-2-methyl-3-N-ethylaminopentane B. P.$_{0.03}$ 123° C.

EXAMPLE 6

To a solution of 20 parts of 1-(3'-bromo-4'-methoxyphenyl)-2-ethyl-n-hexanone-(3) in 140 parts of 94% alcohol are added 10 parts of aqueous 41% methylamine, whereupon the mixture is treated with 7 parts of aluminum amalgam. When at 60–70° C. the whole aluminum amalgam has been brought to reaction, the aluminum hydroxide is filtered off and the resulting mixture worked up in the manner described in Example 1. Also in this case the bromine atom is reductively split off.

The 1-(4'-methoxyphenyl)-2-ethyl-3-N-methyl-aminohexane distils at 104° C. under a pressure of 0.07 mm.

By splitting the methoxy group by means of boiling hydrobromic acid there will be obtained 1-(4'-hydroxyphenyl)-2-ethyl-3-methylaminohexane; the melting point of its hydrochloride lies at 200° C. In a similar manner may be obtained 1-(4'-methoxyphenyl)-2-methyl-3-N-ethylaminohexane, B. P.$_{0.04}$ 102° C.

EXAMPLE 7

19 parts of 1-(4'-methylphenyl)-2-methyl-pentanone-(3) are heated to 165–170° C. for 8 hours together with 24 parts of methyl formamide. After cooling the resulting formyl compound is subjected to hydrolysis by heating it under reflux for 3 hours with 100 parts of concentrated hydrochloric acid. When cold, the mixture is diluted with water, made alkaline with a concentrated sodium hydroxide solution and the base is extracted with ether. After having expelled the solvent the residue is dissolved in dilute hydrochloric acid, the resulting solution again extracted with ether, the base made free by means of caustic soda lye, the base extracted with ether and the ethereal solution dried with anhydrous Glauber's salt. The ether is subsequently distilled off and the base fractionated. The 1-(4'-methylphenyl)-2-methyl-3-N-methylaminopentane distils at 125° C. under a pressure of 11 mm.

According to the above method the following compounds may be produced:

Table III

| Substance | B. P. of the free base |
|---|---|
| 1-phenyl-2-methyl-3-N-ethylaminopentane | B. P.$_{10}$ 120° C. |
| 1-(2'-methylphenyl)-2-methyl-3-N-methyl-aminopentane | B. P.$_{11}$ 133° C. |
| 1-(α-naphthyl)-2-methyl-3-N-isopropyl aminopentane | B. P.$_{0.08}$ 112° C. |
| 1-[α-(2'-methylnaphthyl)]-2-methyl-3-aminopentane | B. P.$_{0.2}$ 117° C. |
| 1-[α-(2'-methylnaphthyl)]-2-methyl-3-N-methylaminopentane | B. P.$_{0.01}$ 116° C. |
| 1-[α-(2'-methylnaphthyl)]-2-methyl-3-N-ethylaminopentane | B. P.$_{0.1}$ 122° C. |
| 1-[α-(4'-methylnaphthyl)]-2-methyl-3-N-methylaminopentane | B. P.$_{0.1}$ 122° C. |
| 1-[α-(4'-methylnaphthyl)]-2-methyl-3-N-ethylaminopentane | B. P.$_{0.2}$ 124° C. |
| 1-(2'-methylphenyl)-2-methyl-3-N-ethylaminopentane | B. P.$_{11}$ 135° C. |
| 1-(3'-methylphenyl)-2-methyl-3-N-methylaminopentane | B. P.$_{0.03}$ 85° C. |
| 1-(3'-methylphenyl)-2-methyl-3-N-ethyl aminopentane | B. P.$_{10}$ 125° C. |
| 1-(4'-methylphenyl)-2-methyl-3-N-ethylaminopentane | B. P.$_{11}$ 125° C. |
| 1-(3':4'-dimethylphenyl)-2-methyl-3-N-methylaminopentane | B. P.$_{13}$ 145° C. |
| 1-(3':4'-dimethylphenyl)-2-methyl-3-N-ethylaminopentane | B. P.$_{11}$ 145° C. |
| 1-(2':4'-dimethylphenyl)-2-methyl-3-N-ethylaminopentane | B. P.$_{10}$ 148° C. |
| 1-(2':4'-dimethylphenyl)-2-methyl-3-N-methylaminopentane | B. P.$_{10}$ 144° C. |
| 1-(β-tetrahydronaphthyl)-2-methyl-3-N-methylaminopentane | B. P.$_{0.02}$ 102° C. |
| 1-(β-tetrahydronaphthyl)-2-methyl-3-N-ethylaminopentane | B. P.$_{0.02}$ 108° C. |
| 1-(β-tetrahydronaphthyl)-2-methyl-3-N-isopropylaminopentane | B. P.$_{0.01}$ 107° C. |
| 1-(α-naphthyl)-2-methyl-3-aminopentane | B. P.$_{0.03}$ 111° C. |
| 1-(α-naphthyl)-2-methyl-3-N-methylaminopentane | B. P.$_{0.05}$ 115° C. |
| 1-(α-naphthyl)-2-methyl-3-N-ethylaminopentane | B. P.$_{0.05}$ 117° C. |
| 1-(α-naphthyl)-2-ethyl-3-aminohexane | B. P.$_{0.02}$ 116° C. |
| 1-(α-naphthyl)-2-ethyl-3-N-methylaminohexane | B. P.$_{0.03}$ 122° C. |
| 1-(α-naphthyl)-2-ethyl-3-N-ethylaminohexane | B. P.$_{0.05}$ 126° C. |

What I claim is:

1. An araliphatic amine of the formula

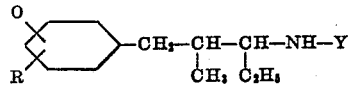

wherein R represents a substituent selected from the group consisting of hydrogen, chlorine and methoxy, X signifies an alkyl radical containing 1 to 6 carbon atoms, and Y stands for an alkyl radical containing 1 to 4 carbon atoms.

2. An araliphatic amine of the formula

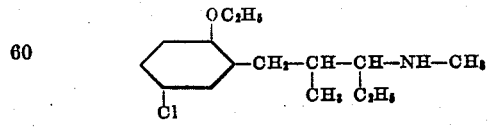

3. An araliphatic amine of the formula

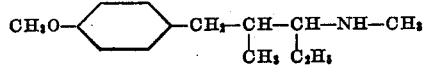

4. An araliphatic amine of the formula

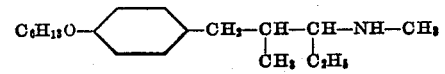

ROBERT BIEDERMANN.

(References on following page)

REFERENCES CITED

The following references are of record in the file of this patent:

UNITED STATES PATENTS

| Number | Name | Date |
|---|---|---|
| 2,407,167 | Kulz | Sept. 3, 1946 |

(Published Apr. 20, 1943, as A. P. C., S. N. 415,519½.)

OTHER REFERENCES

Harries et al., "Berichte deutsche chem Gesell," vol. 36 (1903), page 2999.

Brann et al., "Berichte deutsche chem Gesell," vol. 50 (1917), pages 51-53.

Montagne, "Annales de chimie," Series 10, vol. 13 (1930), pages 106-107.